(12) United States Patent
Kim

(10) Patent No.: US 7,346,326 B2
(45) Date of Patent: Mar. 18, 2008

(54) MOBILE COMMUNICATION TERMINAL WITH EQUALIZER FUNCTION

(75) Inventor: Hyun Kyun Kim, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 761 days.

(21) Appl. No.: 09/998,186

(22) Filed: Dec. 3, 2001

(65) Prior Publication Data

US 2002/0086653 A1 Jul. 4, 2002

(30) Foreign Application Priority Data

Dec. 28, 2000 (KR) ............................... 2000-36770

(51) Int. Cl.
*H04B 1/10* (2006.01)
(52) U.S. Cl. ...................... 455/307; 455/305; 455/306; 455/309; 381/98; 381/103
(58) Field of Classification Search ................ 455/305, 455/306, 307, 309; 381/103, 104, 98, 59; 375/229–236
See application file for complete search history.

(56) References Cited

U.S. PATENT DOCUMENTS

| | | | |
|---|---|---|---|
| 5,436,933 A * | 7/1995 | Andruzzi, Jr. ............... 375/345 |
| 5,450,312 A * | 9/1995 | Lee et al. ...................... 700/1 |
| 5,566,237 A * | 10/1996 | Dobbs et al. ................ 381/103 |
| 5,745,583 A * | 4/1998 | Koizumi et al. .............. 381/86 |
| 5,911,115 A * | 6/1999 | Nair et al. .................. 455/63.1 |
| 5,920,834 A | 7/1999 | Sih et al. ..................... 704/233 |
| 5,995,820 A * | 11/1999 | Young et al. ............. 455/343.1 |
| 6,011,853 A * | 1/2000 | Koski et al. .................. 381/56 |
| 6,035,046 A | 3/2000 | Cheng et al. ................. 381/59 |
| 6,381,468 B1 * | 4/2002 | Larsen et al. ............ 455/550.1 |
| 6,459,942 B1 * | 10/2002 | Markow et al. .............. 700/94 |
| 6,678,318 B1 * | 1/2004 | Lai ............................ 375/232 |
| 6,714,799 B1 * | 3/2004 | Park et al. .................. 455/558 |
| 6,775,322 B1 * | 8/2004 | Zangi et al. ................ 375/232 |

* cited by examiner

*Primary Examiner*—Matthew Anderson
*Assistant Examiner*—Tuan Pham
(74) *Attorney, Agent, or Firm*—Lee, Hong, Degerman, Kang & Schmadeka

(57) ABSTRACT

Disclosed is a mobile communication terminal which is provided with an equalizer function of audio equipment to adjust a timbre of transmitting/received speech sounds so as to satisfy a great number of users having various individualities and tastes simultaneously. The mobile communication terminal according to the present invention includes an equalizer connected to a CODEC, a speaker and a microphone for adjusting a timbre of an analog speech signal inputted thereto from the CODEC and/or a speech signal inputted thereto through the microphone, and an equalizer control circuit for controlling a timbre control operation of the equalizer according to a control signal of a CPU.

13 Claims, 1 Drawing Sheet

MOBILE COMMUNICATION TERMINAL WITH EQUALIZER FUNCTION

BACKGROUND OF THE INVENTION

1. Field of the Invention

The present invention relates to mobile communication terminals, and more particularly, mobile communication terminals having an equalizer function.

2. Description of the Related Art

FIG. 1 is a block diagram illustrating the construction of a mobile communication terminal according to the related art.

Referring to FIG. 1, there is shown a conventional mobile communication terminal including a microphone 10 for inputting a transmitting speech signal of a user, a speaker 20 for reproducing a speech signal received by the mobile communication terminal from his/her counterpart's mobile communication terminal via a base station, a CODEC (Coder and Decoder) 30 for coding and decoding a speech signal, i.e., for converting both an analog speech signal into a digital speech signal and a digital speech signal into an analog speech signal, and a CPU 40 for both controlling the CODEC 30 and processing the digital speech signal inputted thereto from the CODEC 30.

An operation of the conventional mobile communication terminal as constructed above will be described hereinafter with reference to FIG. 1.

When an analog speech signal of a user is inputted to his/her mobile communication terminal through the microphone 10, it is applied to the CODEC 30 which converts his/her analog speech signal into a digital speech signal for application to the CPU 40. At this time, the CPU 40 converts the digital speech signal inputted thereto into a high frequency signal for transmission to a base station through an antenna (not shown).

Then, when a digital speech signal of a high frequency band of the user's counterpart is received by the mobile communication terminal from the base station through the antenna, it is applied to the CODEC 30 through the CPU 40 of thereof. The CODEC 30 converts the digital speech signal into an analog speech signal to output the converted analog speech signal to the outside through the speaker 20 so that a speech of the user's counterpart is reproduced. At this point, the CPU 40 controls the operation of the CODEC 30.

However, since the conventional mobile communication terminal does not include a separate unit for adjusting a timbre or tone color of transmitting/received speech sounds, users had spoken by telephone with each other with a timbre set initially by a manufacturer irrespective of their intentions. In this case, a difference between sensibilities of respective individuals causes some users to be discontented with a sharp or dull speech sound, but mobile communication terminal manufacturers cannot satisfy a great number of users having various desires and individualities simultaneously.

SUMMARY OF THE INVENTION

Therefore, the present invention has been made in view of the above-mentioned problems, and it is an object of the present invention to provide a mobile communication terminal including an equalizer function, which can freely adjust a timbre of transmitting/received speech sounds.

According to one aspect of the present invention, there is provided a mobile communication terminal, comprising: a CODEC adapted to convert a digital speech signal into an analog speech signal; an equalizer adapted to adjust a timbre of the converted analog speech signal inputted thereto from the CODEC; and a CPU adapted to supply a timbre control signal corresponding to a frequency band set by a user to the equalizer, and to supply the digital speech signal received from his/her counterpart's mobile communication terminal to the CODEC.

According to another aspect of the present invention, there is also provided a mobile communication terminal, comprising: a microphone adapted to input a transmitting speech signal; a speaker adapted to reproduce a received speech signal; a CODEC adapted to perform an analog-digital conversion for the transmitting speech signal and a digital-analog conversion for the received speech signal; a CPU adapted to generate a control signal according to a frequency band set by a user; an equalizer control section adapted to generate a timbre control signal according to the control signal of the CPU; and an equalizer adapted to adjust a frequency band of the transmitting/received speech signals according to the timbre control signal inputted thereto from the equalizer control circuit, the equalizer being connected to the microphone, the speaker and the CODEC in such a fashion that the equalizer is disposed between the microphone/speaker and the CODEC.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

Figure 1:
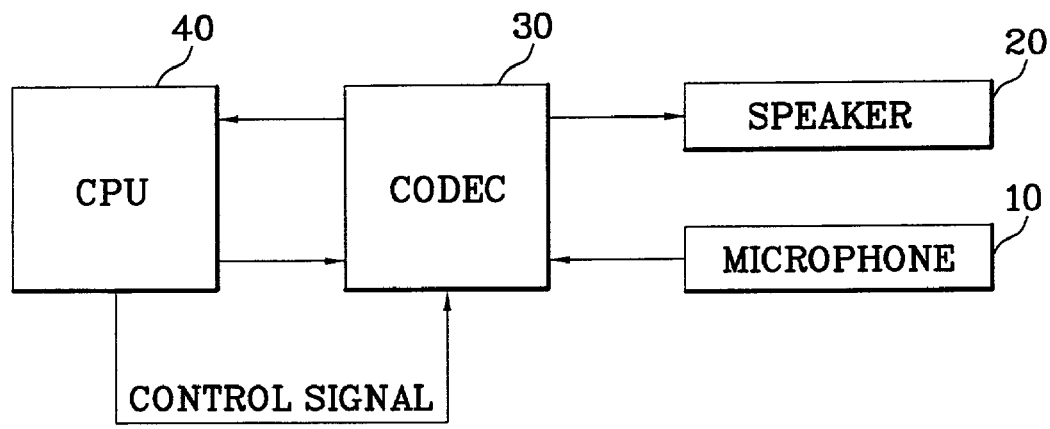
FIG. 1 is a block diagram illustrating a mobile communication terminal according to the related art.

Reference will now be made in detail to the preferred embodiments of the present invention. Throughout the drawings, it is noted that the same reference numerals or letters will be used to designate like or equivalent elements having the same function.

Figure 2:
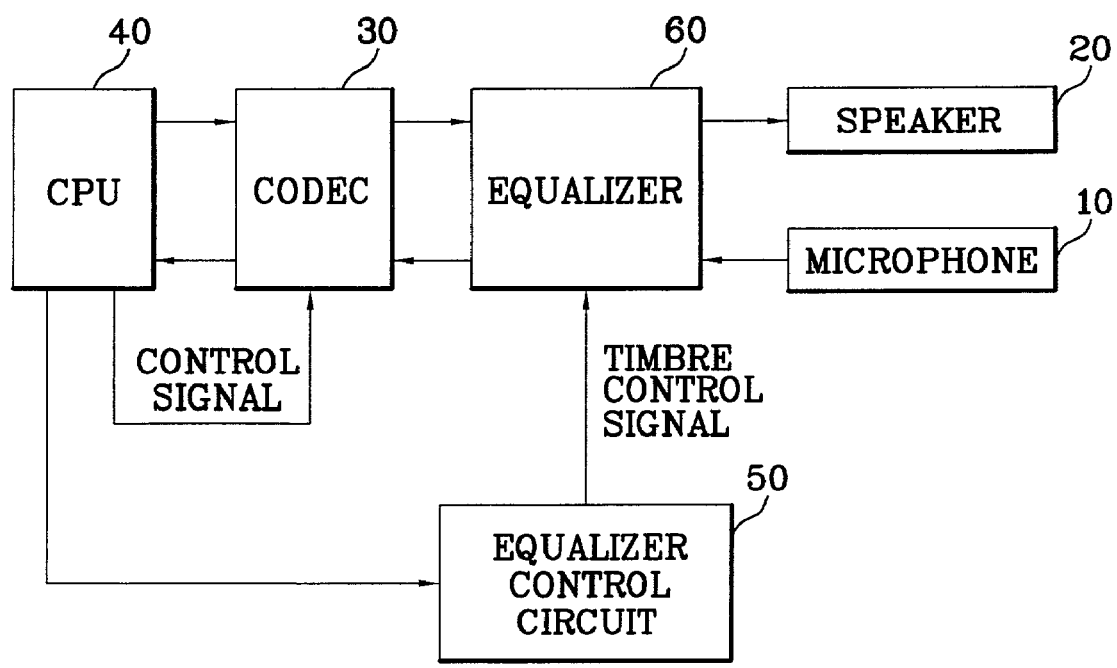
FIG. 2 is a block diagram illustrating a mobile communication terminal having an equalizer function according to the present invention.

FIG. 2 is a block diagram illustrating the inner construction of a mobile communication terminal having an equalizer function according to the present invention.

Referring to FIG. 2, the mobile communication terminal is implemented by adding an equalizer control section 50 and an equalizer 60 to the conventional mobile communication terminal as shown in FIG. 1.

The equalizer control circuit 50 functions to supply a timbre control signal to the equalizer 60 under the control of the CPU 40, and the equalizer 60, which consists of a plurality of active filters, functions to adjust a timbre of a speech signal inputted thereto from the CODEC 30 according to the timbre control signal outputted from the equalizer control circuit 50.

Now, the operation of the mobile communication terminal according to the present invention as constructed above will be described hereinafter with reference to FIG. 2.

First, a user sets an equalizer function on a user menu of the mobile communication terminal to set a desired frequency band. When the equalizer function is set, the CPU 40 supplies a control signal corresponding to the frequency band set by the user to the equalizer control circuit 50. At this time, the equalizer control circuit 50 supplies a timbre control signal for adjusting a frequency band of an analog speech signal to the equalizer 60 according to the control signal inputted thereto from the CPU 40.

Therefore, the equalizer 60 adjusts a frequency band of an analog speech signal of the user inputted thereto through the microphone 10 to apply the adjusted analog speech signal to the CODEC 30 for conversion of the analog speech signal to a digital speech signal, or adjusts a frequency band of a speech signal inputted thereto from the CODEC 30 to apply the adjusted speech signal to the speaker 20 so that a timbre of transmitting/received speech sounds is adjusted. Also, since the operations of the CODEC 30 and the CPU 40 of mobile communication terminal according to the present invention are equivalent to those of the conventional mobile communication terminal, their detailed descriptions will be avoided hereinafter.

Like this, since the mobile communication terminal of the present invention includes an equalizer function, a user can adjust a pitch and a loudness of a sound to conform to his/her taste so that a timbre of transmitting/received speech sounds is adjusted.

Although the present invention has described an example of the case where a timbre of both transmitting and received speech signals is adjusted, it is not limited to this. Also, a timbre of a transmitting or received speech signal can be adjusted. The present invention may also allow the CPU to directly supply the timbre control signal to the equalizer without having a separate equalizer control circuit.

As can be seen from the foregoing, the present invention applies an equalizer function of audio equipment to a mobile communication terminal to adjust a timbre of transmitting/received speech sounds, thereby satisfying a great number of users having various desires and individualities simultaneously.

While this invention has been described in connection with what is presently considered to be the most practical and preferred embodiment, it is to be understood that the invention is not limited to the disclosed embodiment, but, on the contrary, it is intended to cover various modifications, variations or equivalents within the spirit and scope of the appended claims.

What is claimed is:

1. A mobile terminal for use in a wireless communication, comprising:
    a microphone to receive speech signals;
    a speaker to provide audio signals;
    an antenna to receive/transmit signals;
    an input device to receive user interface to control equalizer frequency of the audio signals output to the speaker of the mobile terminal;
    an equalizer configured to adjust a signal to provide equalized signal to the speaker;
    a converting device to convert a digital signal received through the antenna into an analog signal;
    an equalizer controller adapted to supply a timbre control signal; and
    a processor adapted to supply a first control signal corresponding to a frequency band set by a user to the equalizer controller, the equalizer controller to supply the timbre control signal to the equalizer based on the first control signal, the processor further adapted to provide a second control signal to the converting device, and the processor to supply a digital speech signal received from another mobile communication terminal to the converting device.

2. The mobile terminal of claim 1, wherein the equalizer comprises a plurality of active filters.

3. The mobile terminal of claim 1, wherein the converting device comprises a coder and decoder device.

4. The mobile terminal of claim 1, wherein the timbre control signal adjusts the frequency band of the analog signal input to the equalizer according to the control signal.

5. The mobile terminal of claim 1, wherein the microphone provides an analog signal.

6. The mobile terminal of claim 5, wherein the equalizer adjusts the analog signal from the microphone and the converting device converts the adjusted analog signal into a digital signal.

7. A mobile terminal for use in a wireless communication, comprising:
    a microphone to receive speech signals;
    a speaker to provide audio signals;
    an antenna to receive/transmit signals;
    an input device to receive user interface to control equalizer frequency of the audio signals output to the speaker of the mobile terminal;
    a codec configured to decode a coded signal to a decoded signal;
    an equalizer unit configured to adjust the decoded signal received from the codec to provide equalized signal to the speaker; and
    a processor adapted to supply a first control signal corresponding to a frequency band set by a user to an equalizer controller, the equalizer controller being controlled in response to the first control signal, the processor further adapted to provide a second control signal to the codec, and the processor to supply a digital speech signal received from another mobile communication terminal to the codec.

8. The mobile terminal of claim 7, wherein the equalizer unit comprises a plurality of active filters.

9. The mobile terminal of claim 7, wherein the codec comprises a coder and decoder device.

10. The mobile terminal of claim 7, wherein the microphone provides an analog signal.

11. The mobile terminal of claim 10, wherein the equalizer unit adjusts the analog signal from the microphone and the codec converts the adjusted analog signal into a digital signal.

12. A mobile communication terminal, comprising:
    a speaker;
    a microphone;
    a codec adapted to convert a digital speech signal into an analog speech signal;
    an equalizer configured to adjust a signal to provide equalized signal to the speaker;
    an equalizer controller adapted to supply a timbre control signal; and
    a CPU adapted to supply a first control signal corresponding to a frequency band set by a user to the equalizer controller, the equalizer control circuit to supply the timbre control signal to the equalizer based on the first control signal, the CPU further adapted to provide a second control signal to the codec, and the CPU to supply a digital speech signal received from another mobile communication terminal to the codec.

13. A mobile communication terminal, comprising:
    a microphone adapted to input a transmitting speech signal;
    a speaker adapted to reproduce a received speech signal;

a codec adapted to perform an analog-digital conversion for the transmitting speech signal and a digital-analog conversion for the received speech signal;

a CPU adapted to generate a first control signal according to a frequency band set by a user and to provide a second control signal to the codec;

an equalizer controller adapted to generate a timbre control signal according to the first control signal of the CPU; and an equalizer adapted to adjust a signal received from the equalizer controller to provide equalized to the speaker, the equalizer being connected to the microphone, the speaker and the codec in such a fashion that the equalizer is disposed between the microphone/speaker and the codec.

\* \* \* \* \*